March 21, 1950 C. M. MIROSSAY 2,501,286
MACHINE TOOL TRANSMISSION AND CONTROL THEREFOR
Filed June 4, 1947 9 Sheets-Sheet 1
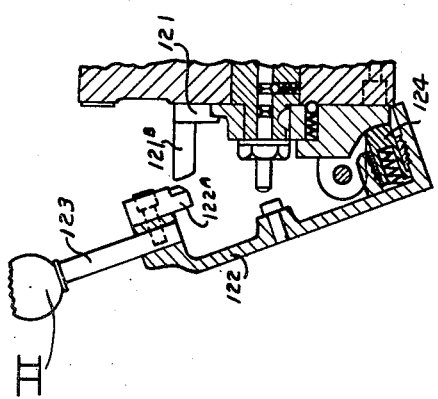
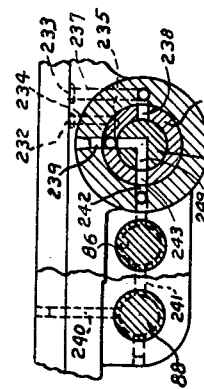
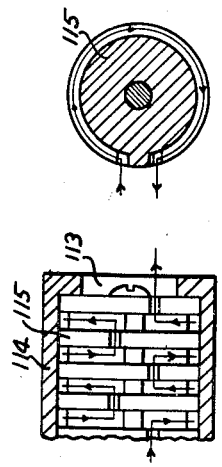
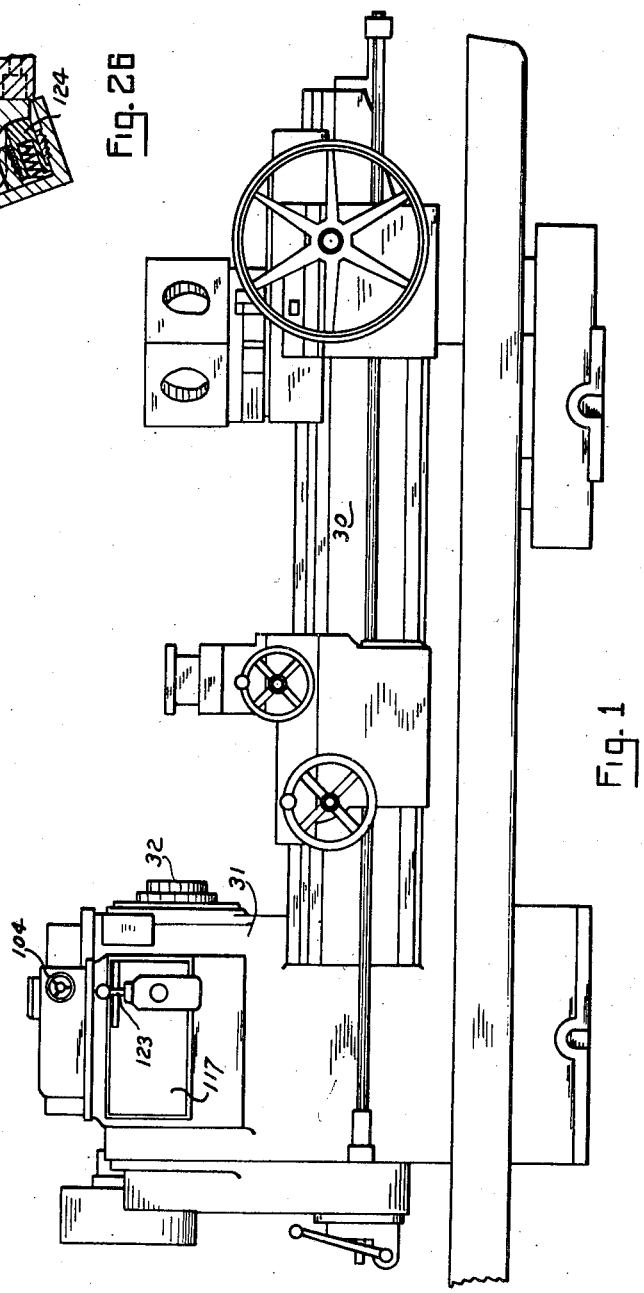
INVENTOR.
CHRYSANTH M. MIROSSAY
BY
Kwis, Hudson, Boughton & Williams
ATTORNEYS

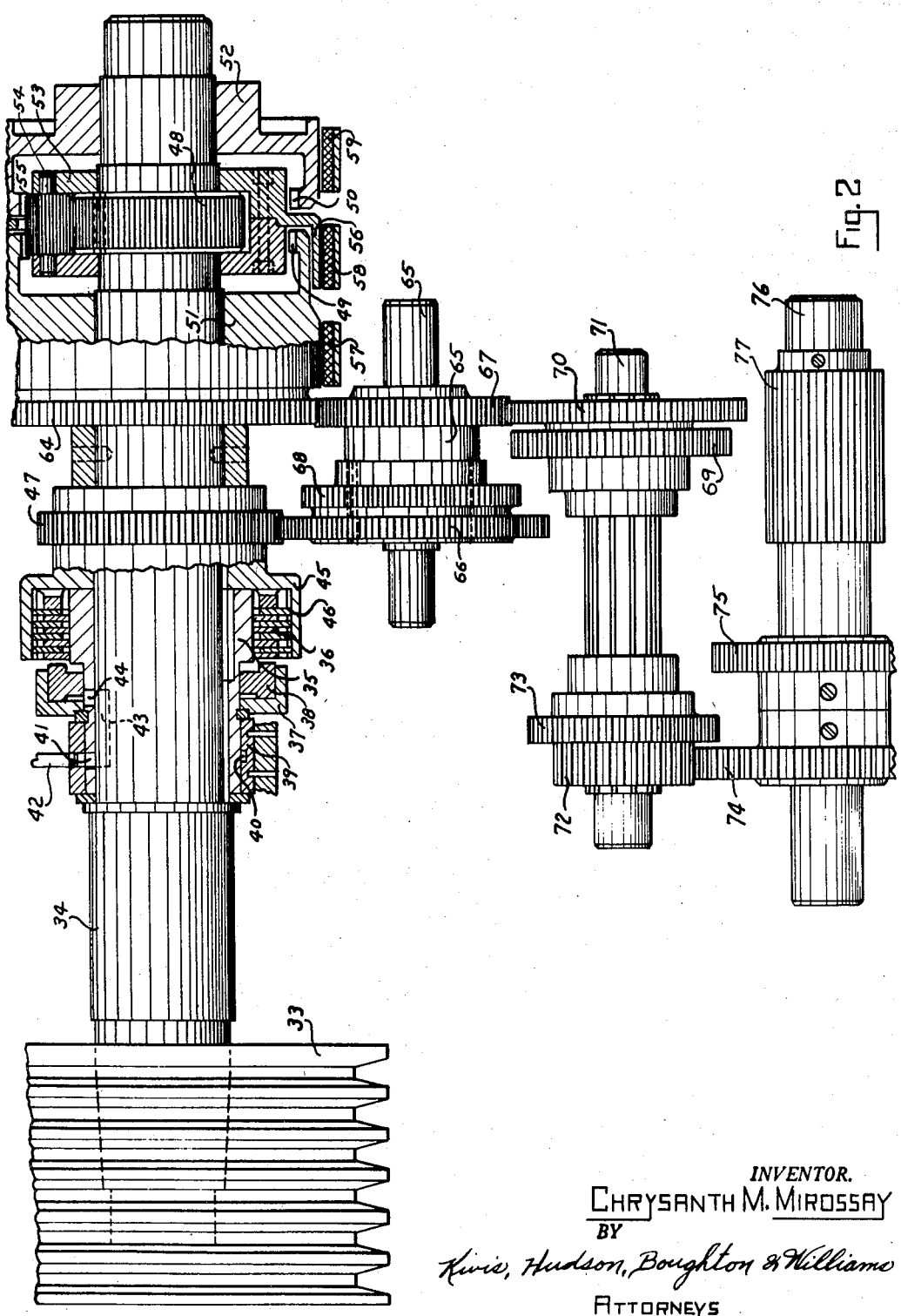

March 21, 1950      C. M. MIROSSAY      2,501,286
MACHINE TOOL TRANSMISSION AND CONTROL THEREFOR
Filed June 4, 1947      9 Sheets-Sheet 3

*INVENTOR.*
CHRYSANTH M. MIROSSAY
BY
*Kwis, Hudson, Boughton & Williams*
ATTORNEYS March 21, 1950     C. M. MIROSSAY     2,501,286
MACHINE TOOL TRANSMISSION AND CONTROL THEREFOR
Filed June 4, 1947     9 Sheets-Sheet 4
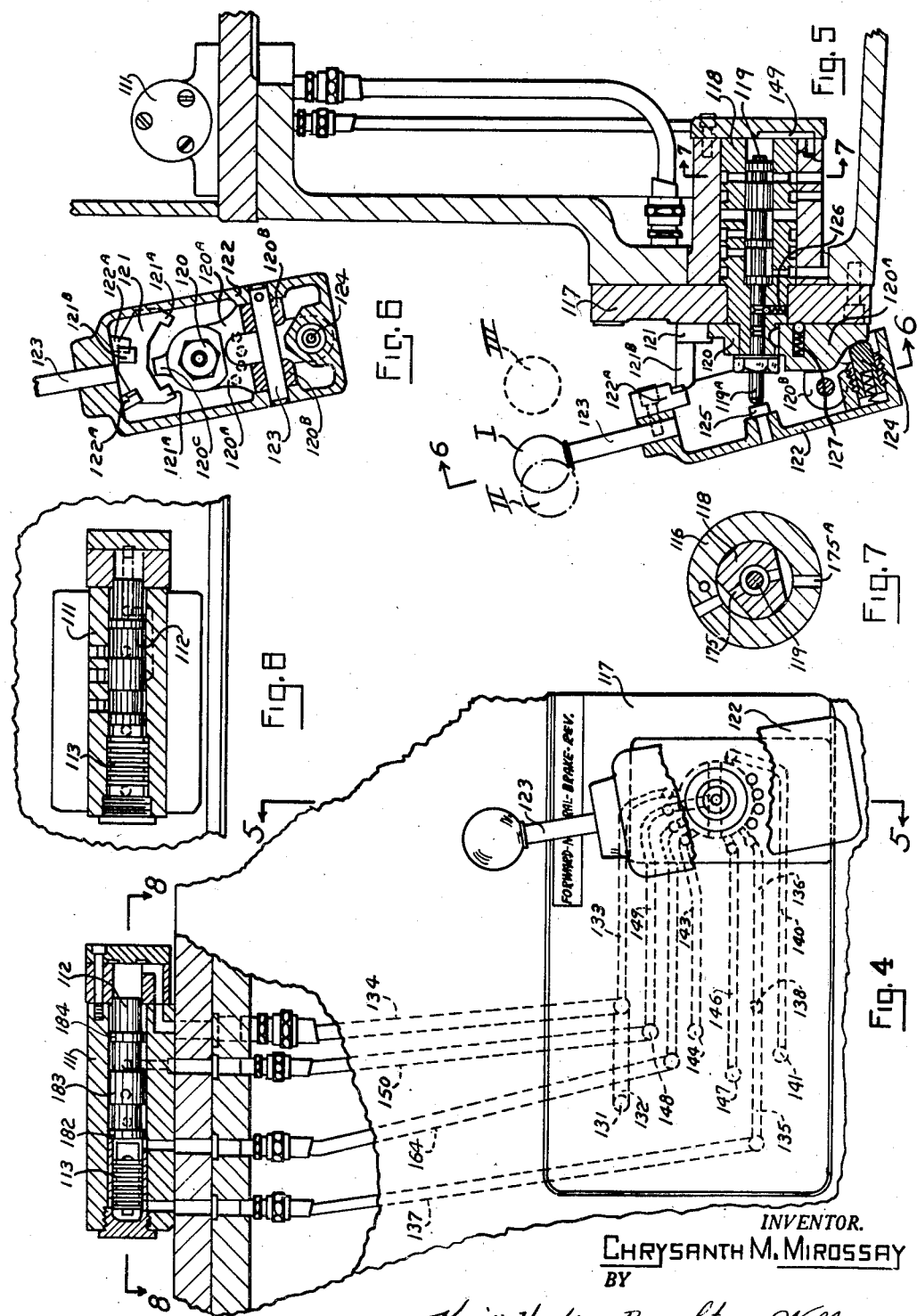
INVENTOR.
CHRYSANTH M. MIROSSAY

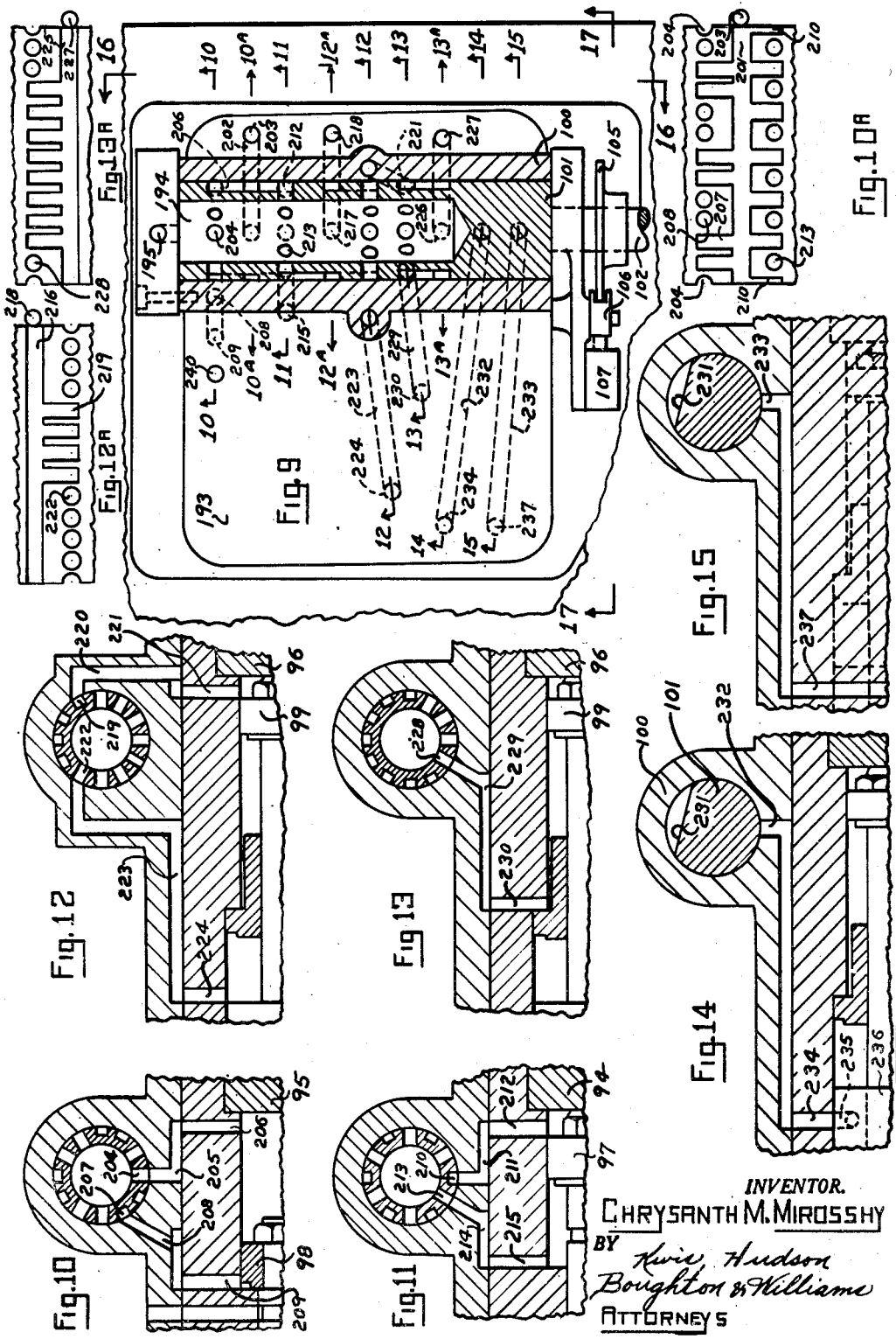

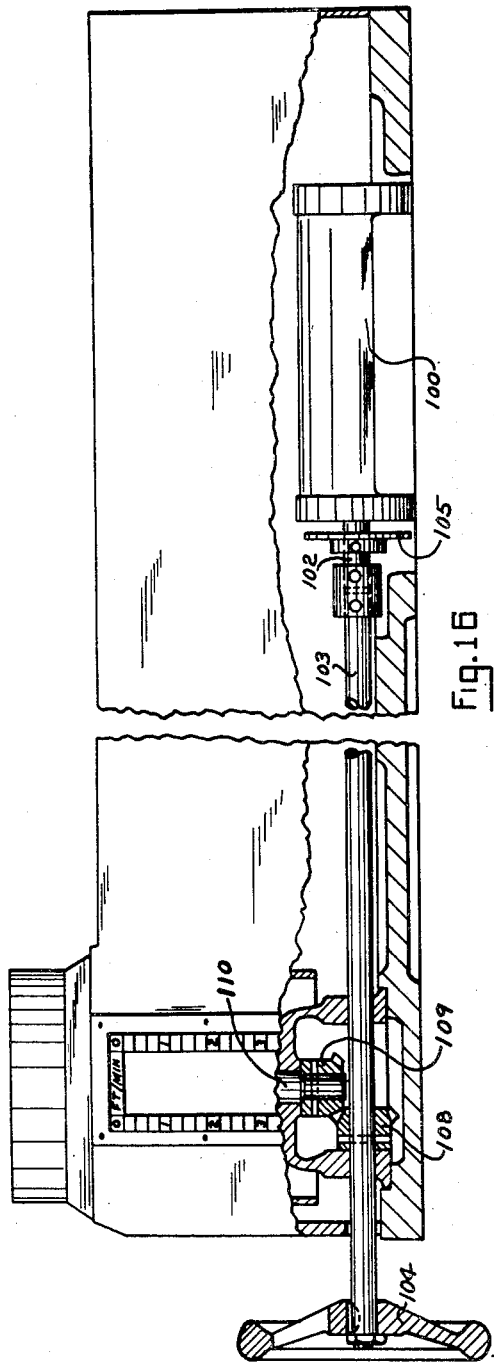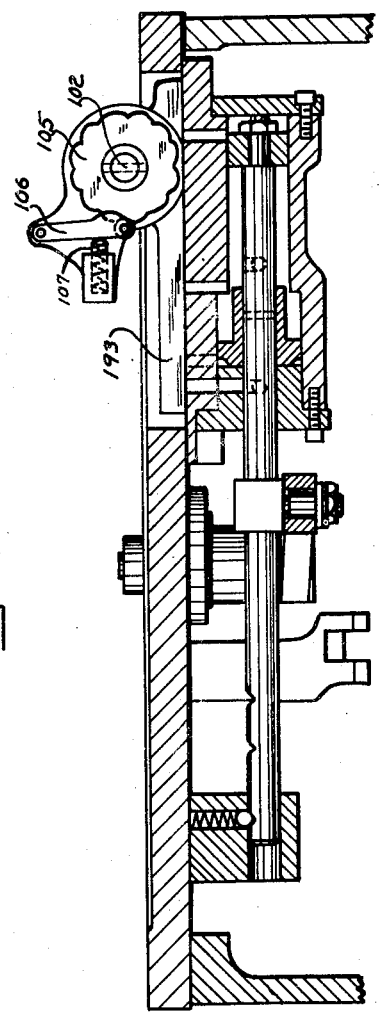

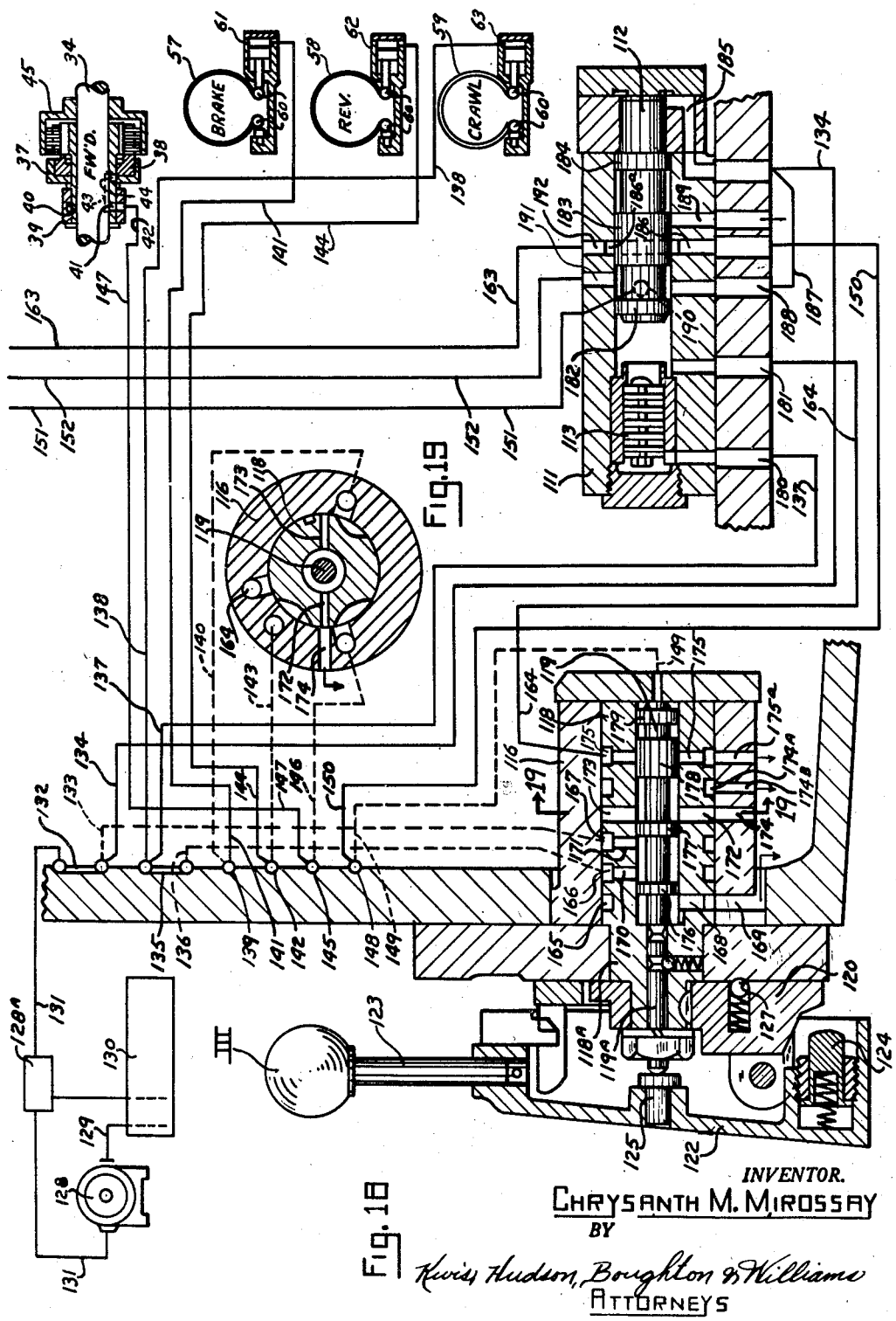

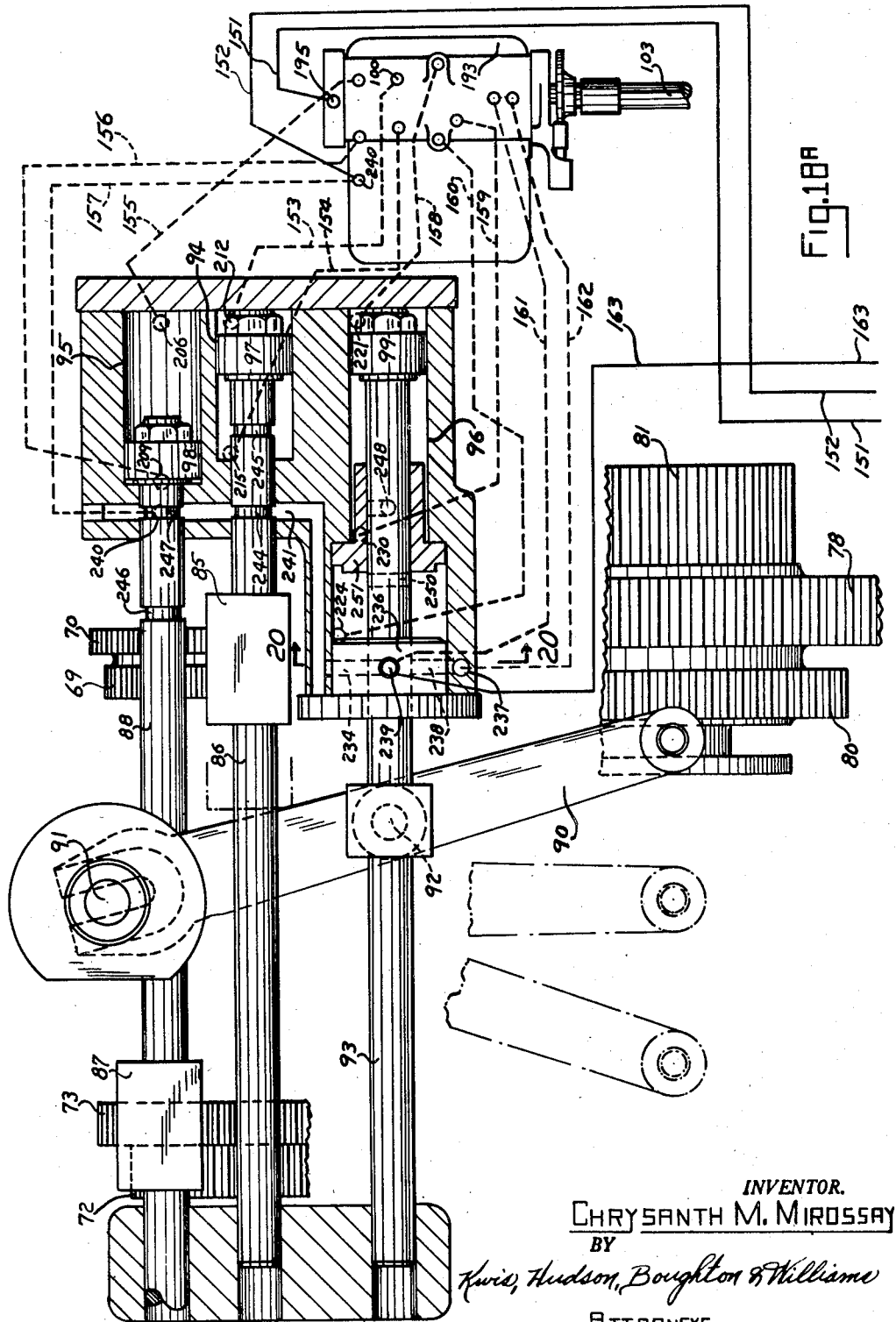

March 21, 1950 C. M. MIROSSAY 2,501,286
MACHINE TOOL TRANSMISSION AND CONTROL THEREFOR
Filed June 4, 1947 9 Sheets-Sheet 9

*INVENTOR.*
Chrysanth M. Mirossay
BY
Hurd, Hudson, Boughton & Williams
Attorneys Patented Mar. 21, 1950

2,501,286

UNITED STATES PATENT OFFICE 2,501,286

MACHINE TOOL TRANSMISSION AND CONTROL THEREFOR

Chrysanth M. Mirossay, South Euclid, Ohio, assignor to The Warner & Swasey Company, Cleveland, Ohio, a corporation of Ohio Application June 4, 1947, Serial No. 752,353

23 Claims. (Cl. 192—4)

This invention relates to a machine tool and particularly to an improved mechanism for controlling the speeds, direction of rotation and the starting and stopping of a movable part of a machine tool such as the work spindle.

An object of the invention is to increase the efficiency of a machine tool as, for instance, a lathe, by enabling the operator to effect with a minimum of effort and skill on his part the changes in speed, direction of rotation and the starting and stopping of a movable part of the machine tool as, for instance, the work spindle.

A more specific object is to increase the efficiency of a machine tool, such as a lathe, by enabling the operator to effect with a minimum of attention and skill on his part the starting and stopping of the work spindle in the headstock, the direction of rotation of said spindle, and the shifting of the gears of the change speed transmission in the headstock to vary the speed of rotation of the spindle.

Another object of the invention is to accomplish the objects above enumerated in such a way as to reduce the wear and tear on the change speed transmission and thus increase the life of the machine and keep maintenance costs to a minimum.

Another object of the invention is to provide in a machine tool of the type having a movable part, a change speed transmission for moving said part at different speeds in opposite directions and means for selecting or preselecting the speed of said part for the different operative steps of a work cycle; improved and novel means for attaining the selected or preselected speed of said part and which means automatically effects a complete speed changing cycle of operation after the operator has manually initiated said cycle of operation.

Another object of the invention is to attain the above mentioned objects by means of an improved and novel pressure fluid operated mechanism for effecting the automatic cycle of the speed changing operation.

Another and more detailed object of the invention is to provide a pressure fluid operated mechanism, as referred to in the last object, and wherein the automatic cycle of operation includes the disengagement of a main drive clutch, the initiatic of a slow speed non-working drive to the transmission to facilitate the shifting of the shiftable elements, a shifting of said elements in a predetermined way and the reengagement of the main drive clutch.

Another object is to provide a fluid pressure operated mechanism as referred to in the previously mentioned objects and wherein a single manually controlled member can be moved in a certain plane to control the direction of operation of the change speed transmission, the starting and stopping of said transmission and the application of a brake means, and in another plane transverse to the first plane to initiate the non-working drive to the transmission and the automatic cycle of the speed changing operation.

Another object is to provide in a machine tool means for shifting the shiftable elements of a change speed transmission wherein once the shifting cycle has been initiated the completion of said cycle is automatically attained independently of any effort or attention of the operator and without the clashing of the shiftable elements.

Another object is to provide in a machine tool having a change speed transmission improved mechanism for shifting the shiftable elements of said transmission so that the time required to change from one speed to another is uniform throughout the entire speed range of the transmission.

A further object is to provide a pressure fluid operated mechanism, as previously referred to, and wherein the automatic cycle of operation includes the disengagement of a main drive clutch, the initiation of a slow non-working drive to the transmission to facilitate the shifting of the shiftable elements, then after a predetermined time delay a shifting of said elements in a selected or preselected way, and the reengagement of the main drive clutch.

Further and additional objects and advantages of the invention not hereinbefore referred to will become apparent hereinafter during the detailed description of an embodiment of the invention illustrated in the accompanying drawings, wherein Fig. 1 is a front elevational view of a turret lathe to which the invention has been applied for purposes of illustration.

Fig. 2 is a developed view of a portion of the change speed transmission in the headstock and which forms the drive to the work spindle.

Fig. 4 is a fragmentary view, partly elevational and partly sectional, of the main control lever on the front of the headstock of the turret lathe shown in Fig. 1 and of certain of the control valves of the fluid pressure circuit, said view being on a larger scale than Fig. 1.

Fig. 5 is a sectional view taken substantially on line 5—5 of Fig. 4 looking in the direction of the arrows, and shows by full lines the control handle in its intermediate position.

Fig. 6 is a sectional view taken substantially on line 6—6 of Fig. 5 looking in the direction of the arrows.

Fig. 7 is a sectional view taken substantially on line 7—7 of Fig. 5 looking in the direction of the arrows.

Fig. 8 is a sectional view taken on line 8—8 of Fig. 4 looking in the direction of the arrows, of the valve shown at the top of Fig. 4, the section of Fig. 8 being taken in a substantially horizontal plane.

Fig. 9 is a fragmentary plan view of the headstock on a larger scale and with the speed selector or preselector valve shown in section.

Figs. 10, 11, 12, 13, 14 and 15 are sectional views through the speed selector or preselector valve and are taken, respectively, on line 10—10, 11—11, 12—12, 13—13, 14—14 and 15—15 of Fig. 9 looking in the direction of the arrows.

Figs. 10a, 12a and 13a are developed views of circumferential portions of the valves shown in Fig. 9 and located intermediate the sections of Figs. 10 to 15 inclusive and showing particularly the inlet and exhaust passageways.

Fig. 16 is a view of the headstock partly in end elevation and with certain parts broken away and shown in section, the sectional view being taken substantially on line 16—16 of Fig. 9 looking in the direction of the arrows.

Fig. 17 is a sectional view taken substantially on line 17—17 of Fig. 9 looking in the direction of the arrows.

Figs. 18 and 18a (sheets 7 and 8) together constitute a diagrammatic showing of the fluid pressure circuit in the headstock with the control handle in its most inward position, i. e., its cycle initiating position.

Fig. 19 (sheet 7) is a sectional view located within Fig. 18 and is taken substantially on line 19—19 of Fig. 18 looking in the direction of the arrows.

Fig. 20 (sheet 1) is a fragmentary end elevational view partly in section of the selector valve housing and the casting for the gear shifting motors, said section being taken along line 20—20 of Fig. 18a.

Fig. 21 (sheet 1) is an enlarged fragmentary view of the time delay unit associated with the valve shown at the top of Fig. 4.

Fig. 22 (sheet 1) is a cross section through one of the plates of the time delay unit shown in Fig. 21.

Figure 23:
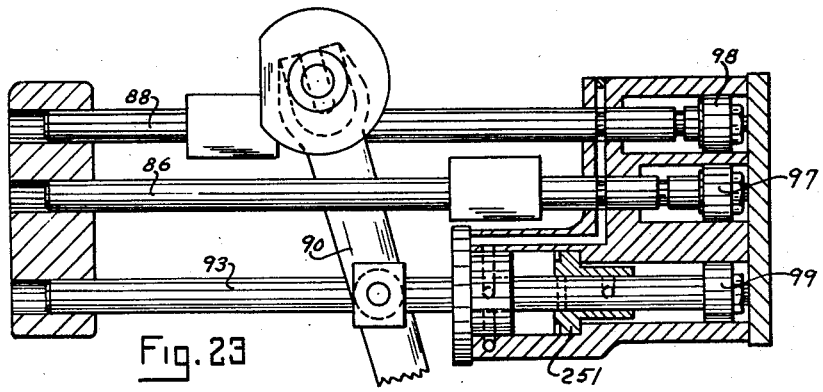
Figure 24:
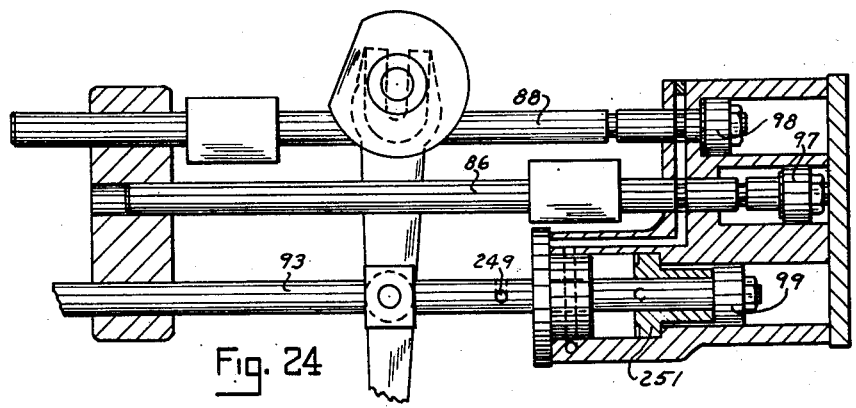
Figure 25:
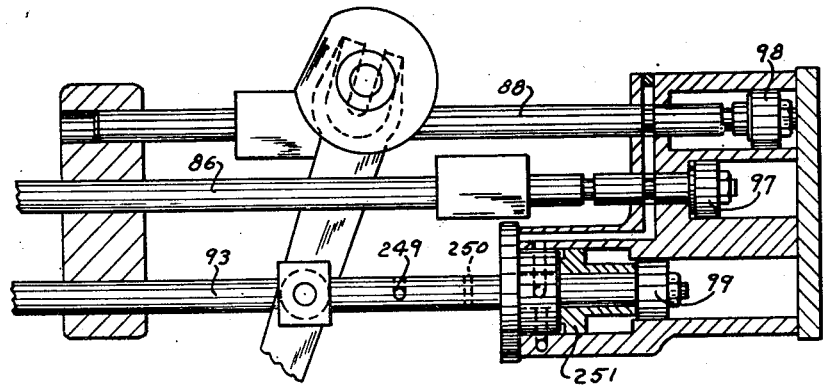

Figs. 23, 24 and 25 (sheet 9) are enlarged sectional views of the gear shifting mechanisms and the fluid pressure motors for actuating the same shown in different operative positions, and Fig. 26 (sheet 1) is a fragmentary sectional view similar to a portion of Fig. 5, but showing the control lever in its most outward position.

In Fig. 1 there is shown a turret lathe comprising a bed 30 at one end of which is located the headstock 31. A work spindle 32 is rotatably mounted in the headstock to be driven at a plurality of different speeds and in opposite directions by means of change speed gearing which will now be described.

Referring to Fig. 2 wherein a portion of the change speed gearing is illustrated, it will be seen that a power source, in this instance a sheave 33, is secured to the main drive shaft 34 and said sheave can be driven in any suitable manner. A fluid pressure operated friction clutch is mounted on the shaft 34 and comprises a sleeve-like clutch member 35 keyed to the shaft and carrying in a well known manner a series of clutch plates 36. The member 35 has fixed thereto a housing 37 in which is movably mounted a clutch actuator or piston 38. A stationary ring 39 surrounds a portion of the sleeve 35 and said ring is provided with an annular groove 40 which is always in communication with an opening 41 in the sleeve 35. A supply conduit 42 (later to be referred to) is connected to the stationary ring 39 and is in communication with the annular groove 40 and hence the opening 41. The opening 41 in the sleeve 35 communicates with an axially extending duct 43 formed in the shaft 34 and said duct in turn communicates with an opening 44 in the sleeve 35 which terminates within the housing 37 and to one side of the piston or actuator, wherefore the actuator or piston 38 can be subjected to pressure fluid to move the same in a clutch actuating direction.

A clutch element 45 is freely rotatable on the shaft 34 adjacent the right hand end of the sleeve 35 and is provided with an enlarged housing portion which internally carries a series of clutch plates 46 interposed between the plates 36 carried by the clutch member 35. It will be understood that when the piston 38 is moved by the pressure fluid toward the right the clutch plates 36 and 46 will be pressed together or engaged and hence the clutch element 45 will be driven by the shaft 34 and element 35. The clutch element 45 is provided with a hub portion having thereon a gear 47 which imparts forward rotation to the change speed transmission, as will later be explained.

In order to impart to the change speed transmission and the work spindle a reverse rotation, a slow non-working rotation in the forward direction and a braking action thereto, a planetary gear unit now to be described is operatively associated with the drive shaft 34. This planetary unit functions to impart the reverse rotation, the slow-non-working forward rotation and the braking action to the transmission independently of the main forward clutch previously described. The planetary unit may be housed in the headstock or in a separate casting secured to the headstock as will be well understood in the art.

The drive shaft 34 is extended beyond the main forward drive clutch mechanism hereinbefore described, i. e., to the right thereof as viewed in Fig. 2, and the extended portion of the shaft has fixed thereto a sun gear 48. The sun gear 48 during the operation of the machine rotates constantly with the shaft 34 in a forward direction and constitutes the driving member of the planetary gear unit. The unit also includes internal gears 49 and 50 spaced axially of the shaft 34 and provided with hub portions 51 and 52, respectively, freely rotatable on the shaft and rotatable within suitable bearing supports formed in the headstock or in the separate casting as the case might be.

A planet gear carrier 53 is freely rotatable on the shaft 34 intermediate the hub portions 51 and 52 and internally of the internal gears 49 and 50. The gear 50 is slightly larger than the gear 49, as for instance, two teeth larger. The gear carrier 53 is formed, in this instance, of two separate parts bolted or otherwise secured together. The carrier mounts one or more bearing shafts 54 extending parallel to the main shaft 34 and each provided with an elongated pinion 55 which meshes with the internal gears 49 and 50 and also with the gear 48. One part of the planet gear carrier 53 is provided with an integral extension passing between the internal gears 49 and 50 and externally surrounding the internal gear 49 and constituting a brake drum 56. The external circumference of the hub portion 51 of the internal gear 49 also constitutes a brake drum as does the external circumference of the internal gear 50. That is, the unit includes three brake drums with the drum 56 connected to the planet gear carrier 53 and the other two drums constituting parts of the internal gears 49 and 50.

Brake bands 57, 58 and 59 of the external contracting type surround the hub portion 51 of the internal gear 49, the brake drum 56 of the planet gear carrier 53 and the external circumference of the internal gear 50.

The brake bands 57, 58 and 59 comprise brake lining material and metal strips supporting the same with the free ends of the strips bent around and secured to pins 60, see Fig. 18. The left hand pins 60, as shown in Fig. 18 (sheet 7), are secured to the headstock or casting while the right hand pins 60 abut, respectively, the piston rods of three fluid pressure motors later to be referred to.

It will be seen that the brake bands float but are held against axial displacement relative to their drums and surround their respective drums and can be contracted into engagement with said drums upon proper movement of the pistons of said fluid pressure motors. The fluid pressure motors for the brake bands 57, 58 and 59 are indicated in Fig. 18 at 61, 62 and 63 respectively.

Each of the fluid pressure motors 61, 62 and 63 comprises a cylinder in which is movably mounted a piston that carries the piston rod. These cylinders are formed in the headstock or in the separate castings supporting the unit and one end of the cylinders is in communication with pressure fluid conduits, later to be referred to, wherefore it will be understood that when pressure fluid is admitted to a cylinder through the referred to conduit its piston will be moved in a direction to contract the brake band operatively associated therewith. The contraction of the brake band 57 holds the hub 51 against rotation and, as will later be explained, imparts a braking action to the transmission. The contraction of the brake band 58 holds the planet gear carrier 53 against rotation, wherefore the pinion 55 is rotated by the gear 48 in the reverse direction and imparts to the internal gear 49 a similar reverse rotation and in turn there is imparted to the transmission a reversed rotation. When the brake drum 59 is contracted the internal gear 50 is held against rotation, wherefore the pinion carrier and its pinion or pinions 55 as a unit rotate around said internal gear 50 and a slow non-working rotation is imparted to the internal gear 49 in a forward direction due to having a less number of teeth and which rotation in turn is imparted to the transmission as a slow non-working rotation of the latter to facilitate the shifting of the gear cones.

The hub portion 51 of the internal gear 49 is provided with a gear 64 which with the gear 47 on the clutch member 45 previously described functions to impart to the transmission reverse or forward rotation as the case may be. The gear 64 is larger than the gear 47, and although the gear 64 is driven through the planetary gearing in a reverse direction at a slower rate than the forward rate of the gear 47, said gear 64, due to its large size, will impart to the transmission a rate of speed in the reverse direction substantially equal to its forward speed.

A three gear cluster is rotatable on a countershaft 65 mounted in the headstock but is held against axial movement on said shaft. This three gear cluster comprises a gear 66 constantly in mesh with the gear 47 and a gear 67 constantly in mesh with the gear 64 and in addition an intermediate gear 68. The gears 67 and 68 of the cluster may be intermeshed, respectively, with the gear 69 or the gear 70 of a shiftable two-step gear cone mounted on the rotatable spline shaft 71 located in the headstock, wherefore it will be seen that said spline shaft can be driven from the drive shaft 34 in both the forward and reverse directions at either one of two different speeds. The spline shaft 71 also carries a second shiftable two-step gear cone formed of the gears 72 and 73 which can be selectively intermeshed, respectively, with gears 74 and 75 fixed on a rotatable shaft 76 mounted in the headstock. The shaft 76 has fixed thereto an elongated gear 77 which meshes with the largest gear 78 of a shiftable three-step gear cone in two positions of said cone. This three-step gear cone is mounted on the spline shaft 79 that is located in the headstock and said three-step gear cone includes the gears 80 and 81 in addition to the gear 78.

Figure 3:
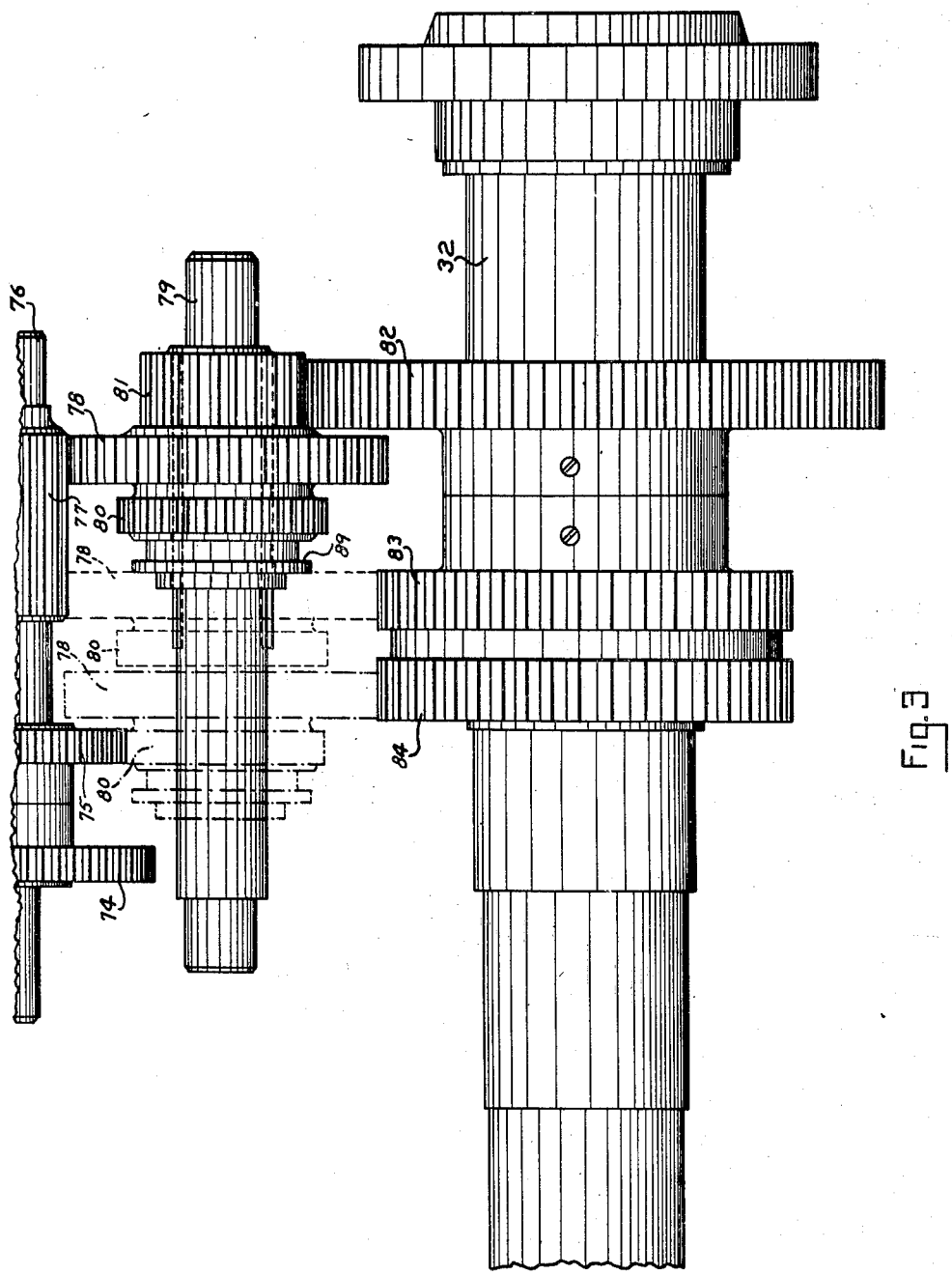
Fig. 3 is a developed view of the remainder of the change speed transmission in the headstock of that shown in Fig. 2 and forming the drive to the work spindle.

Referring to Fig. 3, the three-step gear cone just referred to is shown in full lines in a position wherein the gear 78 is meshed with the elongated gear 77 while the gear 81 is in mesh with the gear 82 fixed to the work spindle 32. In Fig. 3 in the intermediate dash line position of the three-step gear cone the gear 78 is still in mesh with the elongated gear 77 and also is in mesh with the gear 83 of a two gear cluster fixed on the work spindle, the other gear of said cluster being the gear 84. At this time the gear 81 of the gear cone is out of mesh with the gear 82 and the gear 80 is out of mesh with the gear 75.

In Fig. 3 the three step gear cone in the most left hand dot and dash line position has been shifted to move the gear 78 out of mesh with the elongated gear 77 on the shaft 76 and into mesh with gear 84 on the work spindle, while the gear 80 of the gear cone is now intermeshed with the gear 75 on the shaft 76 and hence the drive from the latter to the work spindle is through the gears 75, 80, 78 and 84.

From the foregoing description of the transmission it will be seen that the work spindle can be driven in both the forward and the reverse directions at any one of twelve different speeds depending upon the shifted positions of the two two-step gear cones and of the three-step gear cone.

The two-step gear cone formed of the gears 69 and 70 is shifted by means of a fork straddling the gear cone and carried by a hub portion 85 of the fork which is fixed to a piston rod 86 slidable in the headstock (see Fig. 18a sheet 8). The two-step gear cone formed of the gears 72 and 73 is shifted by means of a fork straddling the gear 73 and formed on a hub portion 87 that is fixed to a piston rod 88 mounted in the headstock. The three-step gear cone formed of the gears 78, 80 and 81 is shifted to its three operative positions by means of a pivoted shoe fitting the groove 89 in the three-step gear cone and carried by the end of a rockable arm 90 the opposite end of which is pivoted within the headstock for limited endwise movement as indicated at 91. The arm 90 intermediate its ends is pivotally secured as indicated at 92 to a piston rod 93 mounted in the headstock.

The piston rods 86, 88 and 93 are extended from three pressure fluid motors indicated in Fig. 18a at 94, 95 and 96 respectively. Said motors are provided with pistons 97, 98 and 99 secured on the rods 86, 88 and 93 and slidable within the cylinders of the motors.

The operation of the three pressure fluid motors just referred to is controlled by a speed selector valve 100 mounted in the headstock, see Figs. 9, 16 and 18a. The speed selector valve comprises a valve housing in which the valve body 101 rotates. The valve body 101 has a shaft 102 extending outwardly of the valve housing and coupled to a shaft 103 rotatably carried by the upper part of the headstock and extending beyond the front thereof where it is provided with a hand wheel 104. It will thus be seen that rotation of the hand wheel 104 will cause rotation of the valve body 101 of the speed selector valve. The particular arrangement of the ports and passages in the speed selector valve will be referred to in detail hereinafter.

The shaft 102 has fixed thereto a disc 105 provided on its periphery with twelve detent notches corresponding to the twelve speeds of the spindle and cooperating with said disc is a roller carried at the lower end of a pivoted arm 106 that is urged by a spring-pressed plunger 107 toward the circumference of the disc (see Fig. 17). Thus the valve body of the speed selector valve will be held in any one of its twelve selected positions. The shaft 103 has fixed to it adjacent its forward end a bevel gear 108 which meshes with a bevel gear 109 fixed to the lower end of an indicator shaft 110 that extends into an indicator carried by the headstock and showing spindle speeds in relation to cutting speeds in feet per minute for different diameters of work and correlated to the selected positions of the valve 100.

The upper part of the headstock also supports a time delay valve 111, the housing of which is provided with a valve chamber slidably mounting a valve body 112 and also having at one end of the chamber a time delay unit 113 (see Figs. 4, 8, 18, 21 and 22). The delay unit 113 is inserted into the housing of the time delay valve 111 from one end thereof and comprises a cup 114 containing a series of baffle disks 115 carried on a rod extending therethrough and with said disks having peripheral notches staggered with respect to each other and providing tortuous paths through the device for the pressure fluid, wherefore it will take a predetermined time period for the pressure fluid to flow through the unit and into the adjacent end of the chamber of the time delay valve.

A main control valve 116 is carried by a plate 117 that is bolted or otherwise secured to the front of the headstock with the housing of the main control valve 116 extending through an opening in the front wall of the headstock. The main control valve is provided in its housing with a valve chamber in which is rockably mounted a valve body 118 and said body in turn is provided with a valve chamber in which a gear shifting cycle control valve body 119 is slidable. The rockable valve body 118 is provided with a hub-like portion 118a that extends outwardly of the valve housing through and beyond an opening in the plate 117 and is rockably supported in said opening. The slidable cycle valve body 119 is provided with an extension 119a which passes through the hub portion 118a of the rockable valve body 118 and extends beyond said hub portion.

Keyed to the reduced outer end of the hub portion 118a of the rockable valve body 118 is a handle bracket 120 which has two downwardly extending spaced leg portions 120a each provided with a forwardly extending lug 120b (see Fig. 6). The bracket 120 is provided on its upper side with an upwardly extending lug 120c.

A stop plate 121 is bolted or otherwise secured to the front side of the plate 117 and is provided with downwardly extending stop lugs 121a lying on opposite sides and in the path of the stop lug 120c and defining the maximum rocking movement in opposite directions which can be imparted to the bracket 120 and the rockable valve body 118. The plate 121 midway of its ends and adjacent its upper edge is provided with a forwardly extending stop lug 121b, the purpose of which will later be explained.

A handle body 122 is pivotally connected to the forwardly extending lugs 120b of the bracket 120, wherefore said handle body can be rocked inwardly and outwardly relative to the front face of the plate 117. The handle body carries at its upper end a handle 123 and said handle and said handle body hereinafter will be referred to conjointly as the handle.

The handle is provided below its pivot with a spring-pressed plunger 124 which cooperates with the lower end of the handle bracket 120 and functions to normally maintain the handle in the position indicated in Figs. 5 and 18 as position I. When the handle is rocked inwardly to position III in Fig. 18 the plunger is out of contact with the handle bracket 120 and when the handle is rocked to position II, i. e., its most outward position as shown in Fig. 26, the plunger 124 is compressed and functions when the handle is released to restore the handle to position I. The handle above its pivot is provided with an abutment pin 125 which is aligned with the extension 119a of the slidable gear shifting cycle control valve body 119 when the handle is in position I and which acts when the handle is moved from position I to position III to move said slidable valve body inwardly. It will be pointed out later that the pressure fluid acts on the slidable valve body at the end of the gear shifting cycle to move said body outwardly and thus move the handle from position III to its normal position I.

The handle is provided with spaced stop lugs 122a which lie on opposite sides of the forwardly extending stop lug 121b when the handle is in positions I and III. The lugs 122a are so spaced that when the handle is in positions I and III it can only be rocked laterally a limited amount, that is, it can only be rocked to and from clutched disengaged or neutral position to brake position indicated in Fig. 4 as positions N and B. It will be noted that when the handle is in position I or position III it cannot be rocked laterally to forward position F or reverse position R as the stop lugs 122a are in the path of movement of the forwardly extending lug 121b. However, when the handle is rocked outwardly to position II then the lugs 122a will not engage the lug 121b and the handle can be rocked laterally its maximum amount within the limits of the lugs 121a, that is, can be rocked to position F or position R. The purpose of rocking the handle inwardly and outwardly from position I to positions III or II and laterally from position N to positions F, B or R will become apparent hereinafter.

A spring point 126 carried by the rockable valve body 118 cooperates with spaced notches in the extension 119a of the slidable cycle valve body 119 to hold said valve body in its two shifted positions corresponding to handle positions I and III. The handle bracket 120 is provided with a spring-pressed ball detent 127 which cooperates with a series of recesses formed in the plate 117 to hold the handle bracket 120 in its various laterally rocked positions corresponding to positions F, N, B and R of the handle (Fig. 4).

The hydraulic circuit in which the various valves and fluid pressure motors hereinbefore referred to are included will now be described with particular reference to Figs. 9, 10 to 15 inclusive, 10a, 12a, 13a, 18 and 18a. A pump 128 has its input side connected by a conduit 129 with a diagrammatically shown sump or reservoir 130 (the lower portion of the headstock casting) while its output side is connected with a conduit 131 that extends to a passage or milled groove 132 which is shown in Fig. 4 as located on the inner side of the plate 117 although in Fig. 18 for purposes of convenience as to space said passage is shown on the rear side of the headstock wall. The conduit 131 may contain a suitable pressure relief valve 128a to maintain a predetermined line pressure. The groove 132 is connected by an inlet groove 133 with the valve chamber of the main control valve 116. The groove 132 is also connected to a pipe 134 which extends to the time delay valve 111 and is the inlet conduit for said valve. The plate 117 is provided with another groove 135 and a groove or passage 136 extends from said groove to the main control valve 116. A pipe 137 extends from the groove 135 to the time delay valve 111. In addition, a pipe 138 extends from the groove 135 to the fluid pressure motor 63 which effects the crawl or non-working speed for the transmission. The plate 117 is provided with a groove 139 interconnecting a groove 140 that extends to the main control valve and a pipe 141 that extends to the fluid pressure motor 61 for actuating the brake. The plate 117 is also provided with a groove 142 which interconnects a groove or passage 143 extending to the main control valve 116 and a pipe 144 extending to the fluid pressure motor 62 for effecting the reverse drive of the transmission.

The plate 117 is also provided with a groove 145 which interconnects a groove 146 extending to the main control valve 116 and a pipe 147 extending to and connected with the supply line 42 for the main clutch. In addition the plate 117 is provided with a groove 148 that interconnects a passage 149 which extends to the main control valve and a pipe 150 which extends to the time delay valve.

The time delay valve is connected by a pipe 151 with the speed selector valve 109. This speed selector valve is connected with the time delay valve additionally by a pipe 152. The fluid pressure motor 94 which functions to shift the two-step gear cone formed of the gears 69 and 70 is connected to the speed selector valve by passages indicated diagrammatically at 153 and 154. The fluid pressure motor 95 which actuates the shifting of the two-step gear cone formed of the gears 72 and 73 is connected to the speed selector valve by passages indicated diagrammatically at 155 and 156. In addition, the speed selector valve is connected to a passage in the housing of the motor 95 by a passage indicated diagrammatically at 157. The pressure fluid motor 96 which functions to shift the three-step gear cone is connected to the speed selector valve by passages 158, 159, 160, 161 and 162, the flow of fluid in said passages 161 and 162 being controlled by all three pressure fluid motors. The motor 96 is also connected by a pipe 163 with the time delay valve 111. In the diagrammatic showing of the passages 153, 154, 155, 156, 157, 158, 159, 160, 161 and 162 in Fig. 18a said passages have been indicated in their entireties by dash lines but will later be described as to their constituent parts and separate reference characters used for this purpose.

The time delay valve 111 is connected by a pipe 164 with the control valve 116 for the purpose of draining the pressure fluid from the time delay valve in order that said valve can be restored to its normal position as will later be described and as is indicated in Fig. 4.

The rotary valve body 118 of the main direction and drive control valve is provided adjacent its left hand end, as viewed in Fig. 18, with three annular grooves 165, 166 and 167, with said grooves 166 and 167 connected, respectively, to the grooves or passages 136 and 133. The annular groove 165 is in communication with the central chamber in the rotary valve body by means of a radial port 168 and is also in communication with a drain passage 169. The grooves 166 and 167 are in communication with said central chamber by means of radial ports 170 and 171.

The rotary valve body 118 to the right of the annular groove 167, as viewed in Fig. 18, is provided with diametrically aligned radial passages 172 and 173 which communicate with the central chamber, with the passage 172 communicating when the valve body is in neutral position with a drain passage 174 formed in the valve housing as clearly shown in Fig. 19.

When the valve body 118 is rocked to forward position, i. e., to the left of neutral, the passage 172 is in communication with the groove or passage 146. When the valve body 118 is rocked to the right of neutral position and into brake position then the passage 172 is dead-ended, while the passage 173 is in communication with the passage 140. When the valve body 118 is rocked still farther to the right of neutral and into reverse position the passage 173 is dead-ended and the passage 172 is in communication with passage 143. The rotary valve body 118 is provided with three axially extending but wide grooves in its circumference which act as drain grooves to place the passages 146, 143 or 140 in communication with the circular drain groove 174a in the valve body 118 connecting with drain passage 174b in the valve housing. The drain pipe 164 from the time delay valve 111 communicates with a diametral passage 175 extending through the valve body 118 and communicating with the drain passage 175a in the valve housing.

The slidable gear shifting cycle control valve body 119 is provided with spaced lands 176 and 177 which cooperate in the two different valve body positions with the ports 170, 171 and 168. The valve body 119 is further provided with a wide land 178 and a narrow land 179 located adjacent the right hand end of the valve as viewed in Fig. 18. When the shiftable valve body 119 is in its normal position, as shown in Fig. 5, the land 176 is at the extreme left hand end of the chamber in the rotary valve body 118 and the space between the lands 176 and 177 is in communication with the ports 168 and 170. At this time the land 177 lies intermediate the ports 170 and 171 and hence the latter port is in communication with the space between the lands 177 and 178 and radial passages 172 and 173. Also at this time the wide land 178 is located intermediate the radial passages 172 and 173 of the rotary valve body and the diametrical passage 175 therein, and hence said diametrical passage is uninterrupted so that pressure fluid can flow therethrough to drain through passage 175a passing between the wide land 178 and the right hand narrow land 179. When the shiftable valve body 119 has been moved to its most inward position by the movement of the handle to position III as shown in Fig. 18, then the lands 176 and 177 lie on opposite sides of the ports 170 and 171 and said ports are in communication with each other. At this time the land 177 interrupts communication between the port 171 and the radial passages 172 and 173, while the wide land 178 interrupts the diametrical passage 175 through the rotary valve body 118.

It will be noted that the groove or passage 149 communicates with the right hand end of the valve chamber in the rotary valve body 118 and hence when pressure fluid is admitted to said chamber through this passage it will act to shift the slidable valve body 119 from its most inward or right hand position of Fig. 18 back to its normal most left hand position of Fig. 5 and, in turn, shift the handle 123 from position III to position I.

The pipe 137 connects with a port 180 in the housing of the time delay valve 111 and said port, in turn, communicates with one end of the time delay unit 113. The interior of the housing of the time delay valve and adjacent the opposite end of the time delay unit is provided with a port 181 which communicates with the drain pipe 164 that extends to the main control valve.

The valve chamber in the time delay valve 111 and to the right of the time delay unit 113 has slidably mounted therein the time delay valve body 112 and said body is provided with three lands 182, 183 and 184. The valve body 112 to the right of the land 184, as viewed in Figs. 4 and 18, is of reduced diameter as compared to the diameter of the land 182 for a purpose which will later be explained.

The pipe 134 communicates with a passage 185 in the housing of the time delay valve and said passage extends to the right hand end of the valve chamber. The pipe 150 extends to and communicates with a port 186 formed in the valve housing and which communicates with an annular groove 186a formed in the wall of the valve chamber of the time delay valve and located when the time delay valve is in the normal position of Fig. 4 intermediate the lands 183 and 184.

The pipe 134 and passage 185 are connected by a passage 187 with a port 188 in the valve housing which communicates with the valve chamber. The valve housing is also provided with a port 189 which is a drain port as will later be explained. The pipes 151 and 152 are connected, respectively, with radial ports 190 and 191 communicating directly with the valve chamber, while pipe 163 is connected with port 192 communicating with the circular groove 186a.

The selector valve 100 is carried by a plate 193 which overlies the fluid pressure motors 94, 95 and 96 and hence the valve housing, said plate and the housings of the fluid pressure motors can be provided with grooves, passages, drilled openings and the like forming short passages for the pressure fluid (heretofore indicated and identified diagrammatically) and without requiring the use of piping for such purpose, as clearly shown in Figs. 9, 10 to 15 inclusive, 17 and 18a.

The rotatable body 101 of the speed selector valve is provided with a bore 194 that extends part way through the body from the rear end thereof. The valve body is provided throughout its length with a plurality of circularly spaced radial ports connecting with the bore 194 and with a plurality of cylindrical recesses or grooves having axially extending branch grooves in the periphery of the valve body (see Figs. 10a, 12a and 13a). It will be understood that the valve body 101 has twelve different operative positions since there are twelve operative speeds for the spindle.

In Figs. 10 to 15 inclusive, the referred to ports and grooves are clearly indicated and said sections represent the relationship of the ports and recesses or grooves with respect to the passages to the pressure fluid motors and to the main control valve and the time delay valve for one speed setting of the selector valve. It will be clear to one skilled in the art the manner in which the ports, passages and recesses or grooves cooperate for the other selector valve settings for the various speeds of the spindle.

Referring to Figs. 9 and 18a, it will be seen that the pipe 151 which is the inlet is connected to the bore 194 of the selector valve body through a drilled opening 195 formed in the rear end plate of the valve body.

Although the connections between the speed selector valve and the various pressure fluid motors for shifting the gear cones have been indicated diagrammatically by dash lines in Fig. 18a and reference numerals applied to said lines, such connections will now be described in specific detail with reference to Figs. 9 to 15 inclusive, 10a, 12a, and 13a and the component parts of said connections will be given independent identifying reference numerals.

Referring to Figs. 9, 10 and 10a, it will be seen that the valve body 101 is provided with six radial ports and six lateral extensions from the circular peripheral groove 201. The peripheral groove 201 overlies and communicates with a groove 202 formed in the underside of the valve housing plate and in turn communicating with a drilled opening 203 in the casting and leading to the drain or sump.

In the position of the valve shown in Figs. 9 and 10 the radial port 204 of the six radial ports is in communication with the drilled opening and groove 205 in the valve housing and which communicates with a drilled opening 206 in the housing of the pressure fluid motor 95, with said opening extending to one end of the cylinder of said motor. The lateral extension 207 of the six lateral extensions from the annular groove 201 communicates in this position of the valve with a drilled opening and groove 208 formed in the valve housing and communicating in turn with the drilled opening 209 in the housing of the pressure fluid motor 95 and extending to the opposite end of the cylinder of said motor.

Referring to Figs. 9, 10a and 11 it will be seen that the portion of the valve included in the section of Fig. 11 contains six radial ports and six lateral extensions from the circular groove 201. In this position of the valve the lateral extension 210 registers with the drilled opening and groove 211 in the valve housing with said groove communicating with the drilled opening 212 formed in the housing of the pressure fluid motor 94 and communicating with one end of the cylinder thereof. The radial port 213 communicates with the drilled opening and groove 214 in the valve housing with said groove communicating with the drilled opening 215 in the housing of the pressure fluid motor 94 and extending to the opposite end of the cylinder of said motor.

Referring to Figs. 9, 12 and 12a it will be seen that this portion of the valve contains eight radial ports and four lateral extensions from a circular peripheral groove 216 that overlies an opening and groove 217 in the valve housing which communicates with a drilled opening 218 that leads to the sump. The lateral extension 219 of the four extensions communicates with a drilled opening and groove 220 in the valve housing and extending to the drilled opening 221 in the housing of the pressure fluid motor 96 and which latter opening communicates with one end of the narrow portion of the cylinder of said motor. The radial port 222 of the eight radial ports communicates with the drilled opening and groove 223 in the valve housing and the latter in turn with the drilled opening 224 in the housing of the motor 96 and extending to the opposite end of the cylinder of said motor.

Referring to Figs. 9, 13 and 13a it will be seen that this portion of the valve body is provided with four radial ports and eight lateral extensions from the annular groove 225. The annular groove 225 overlies a drilled opening and groove 226 in the valve housing which extends to an opening 227 in the casting and communicating with the sump. The radial port 228 in this position of the valve communicates with a drilled opening and groove 229 in the valve housing and extending to the drilled opening 230 in the housing of the motor 96 and communicating with the cylinder thereof intermediate its ends and at the end of the small bore portion of the cylinder immediately adjacent the large bore portion thereof, it being recalled that the motor 96 actuates the three step gear cone and hence must have three operative positions as will later become apparent.

Referring to Figs. 9, 14 and 15 it will be seen that the periphery of the valve body 101 at this portion thereof is provided with a flat 231 extending axially of the body and forming with the wall of the valve chamber an axially extending passageway which when the body is turned and the flat overlies the drilled openings and grooves 232 and 233 will bridge said openings and place the same in communication with each other. The drilled opening and groove 232 communicates with a drilled opening 234 in the housing of the motor 96 with the latter communicating with a drilled opening 235 in the cylinder head 236 of the motor 96. The drilled opening and groove 233 communicates with a drilled opening 237 formed in the housing of the motor 96 and communicates in turn with a drilled opening 238 in the cylinder head 236.

The drilled opening 235 (see Fig. 20, Sheet 1) communicates with a drilled opening 239 extending at right angles thereto and formed in the cylinder head 236 and in the housing of the motor 96 and connected to the pipe 163. It will be noted that the openings 238 and 239 communicate with the bore for the piston rod 93, said openings being spaced 90° apart for a purpose later to be explained. The pipe 152 is connected to the top of an opening 240 formed in the plate 193 and in the housing for the motor 95. This opening 240 extends to the bore for the piston rod 88.

The housing for the motors 94, 96 and 95 is provided with an L-shaped opening or passage 241 intersecting the bores for the piston rods 88 and 86, see Figs. 18a and 20. The opening 241 extends to and communicates with an opening 242 formed in the housing of the motor 96 and communicating in turn with a drilled opening 243 which extends to the bore for the piston rod 93 and is aligned with the opening 238. The piston rods 86 and 88 of the motors 94 and 95 which shift the two two-step gear cones are provided with longitudinally spaced circumferential grooves 244 and 245 for the rod 86 and 246 and 247 for the rod 88. It will be seen that at the end of each operative stroke of the pistons 97 and 98 of the motors 94 and 95 one or the other of the grooves 244, 245, 246 and 247 will align with the opening or passage 241 and hence pressure fluid will be free to flow through said openings and past the piston rods and into the openings 242 and 243. The piston rod 93 of the three-position motor 96 is provided with longitudinally spaced L-shaped passages 248 and 249 and intermediate said L-shaped passages with a diametral passage 250, see Figs. 18a and 20.

It will be seen that when the piston 99 is in its most right hand position the L-shaped passage 249 in the piston rod 93 will register with the openings 243 and 239. When the piston 99 is in its intermediate position the diametral passage 250 will register with the openings 243 and 238, while when the piston 99 is in its most left hand position the L-shaped passage 248 will be in alignment with the openings 243 and 239.

The piston rod 93 of the motor 96 has slidably mounted thereon within the motor cylinder a stop piston 251 in the form of a headed sleeve with the head sliding in the large portion of the cylinder.

Referring to Fig. 18a, the piston 99 is shown in its most right hand position. Assuming that it is desired to move the piston 99 to its intermediate position and that pressure fluid is flowing into the cylinder to the right of the piston and to the left of the stop piston, it will be seen that the stop piston will be moved to the limit of its right hand movement and that as soon as the piston 99 in its leftward movement engages the right hand end of the sleeve of the stop piston further movement of the piston 99 toward the left will be arrested due to the area differentials between the piston 99 and the head of the stop piston 251. This condition is clearly illustrated in Fig. 24.

When it is desired to move the piston 99 to its most left hand position, as indicaated in Fig. 25, then pressure fluid is admitted to the right of the piston 99 and the stop piston 251 and is exhausted from the left of the stop piston, whereupon the piston and the stop piston move as a unit toward the left until they have reached the left hand limit of movement. When it is desired to move the piston 99 to its intermediate or to its right hand position from its most left hand position, pressure fluid is admitted to the left of the stop piston and to the left of the piston 99, whereupon both pistons move toward the right until the stop piston reaches its most right hand position as indicated in Fig. 24. If pressure fluid continues to be supplied to the left of the piston 99 then said piston and piston rod will move toward the right relative to the stop piston from the position shown in Fig. 24 and into the position shown in Fig. 23.

In order to coordinate and clarify the description hereinbefore given a résumé of the operation of the machine will now be set forth. Assuming that the sheave 33 and shaft 34 are being power driven and that the pump 128 is operating so that the pressure fluid system can function and that a work piece is mounted in the chuck of the work spindle while the control handle 123 is in positions 1 and N, that is normal and neutral positions, then the operator turns the wheel 104 to set the selector valve 100 for the desired spindle speed in relation to the diameter of the work in accordance with the cutting speed in feet per minute of the tool. Of course the operator could have near the end of the previous work cycle turned the wheel 104 to set the selector valve 100 to preselect the spindle speed for the new operative cycle. It will be assumed that the spindle speed selected corresponds to the setting of the valve 100 as shown in Figs. 9 to 15 inclusive. Inasmuch as the control handle is in positions 1 and N the settings of the selector valve does not cause the gears to be shifted since said valve is receiving no pressure fluid at this time. The operator by moving the control lever inwardly from position 1 to position 3 shifts the gear shifting cycle control valve body 119 from the position shown in Fig. 5 into the position shown in Fig. 18 and the spring detent 126 will hold the valve body 119 in its shifted position. The shifting of the valve body 119 initiates the gear shifting cycle since it causes the pressure fluid to flow via the main control valve from supply groove 133 into the groove 136 and then through groove 135 and pipe 138 to the motor 63 which contracts the brake band 59 to hold the internal gear 50 stationary and cause through the planetary unit a crawl speed to be imparted to the gear 64 and to the change speed transmission in the forward direction. Also at this time the groove 136 is connected through the groove 135 to the pipe 137 which extends to the time delay unit 113 of the time delay valve. After the time interval has elapsed that is required for the pressure fluid to flow through the unit 113 and build up in the valve chamber to the right of said unit, said fluid operates on the shiftable time delay valve body to shift the same toward the right from the position shown in Figs. 4 and 8 and into the position shown in Fig. 18. At this time the pressure fluid is flowing to the time delay valve through the pipe 134 which is connected with the passages 185 and 188 in the time delay valve. It will be noted that the pressure fluid flows to the right of the time delay valve through the passage 185 but due to the area differentials of the opposite ends of said valve body the latter is maintained against this pressure in its right hand position. The pressure fluid flowing through passage 188 passes between the lands 182 and 183 of the time delay valve and outwardly through the pipe 151 to the interior of the selector valve body 101. Also the pressure fluid passing between the lands 182 and 183 flows through the passage 191 and pipe 152 to the opening 240.

It will be noted that the pressure fluid flows first through conduit pipe into the selector valve before it flows through pipe 152 to the opening 240. Hence the pistons of the motors 94, 95 and 96 will start moving before the pressure fluid is in the opening 240 and thus by the time that the pressure fluid is in said opening the piston rods of said motors will have moved to fill the bore and block the opening 241.

It will be seen that at least one of the three piston rods must move to effect a gear shift and hence the passage of fluid through openings 241, 243 and 239 will always be blocked until the shifting has been completed. As soon as the pistons of the motors have been shifted to produce the selected gear shift then the annular grooves in the piston rods 86 and 88 and either the L-shaped passages 248 and 249 or the straight passage 250 in the piston rod 93 will open the openings 241, 242 and 243 so pressure fluid can flow through the opening 239 and thence by the pipe 163 to the annular groove 192 in the housing of the time delay valve, from whence it goes to the pipe 150 and thence through grooves 148 and 149 and into the right hand end of the valve chamber of the main control valve to shift the slidable valve body 119 from its right hand position of Fig. 18 into its left hand position of Fig. 5. The shifting movement overcomes the detent 126 to take it out of the left hand groove in the extension of the slidable valve body until it snaps into the right hand groove to hold the valve body in its left hand position. Also the shifting of the valve body 119 assures that the control lever 123 is returned to position I. At this time the pressure fluid is passing from the inlet port 171 between the lands 177 and 178 of the shiftable valve body and thence into passages 172 and 173 of the rockable valve body 118, the passage 172 being connected to the port 174 and the pressure fluid is returning to the sump.

It will be understood that as soon as the shiftable valve body 119 has been shifted from its right hand position back to its normal left hand position of Fig. 5 then the land 177 located between the ports 170 and 171 interrupts the flow of pressure fluid to the groove 136 and thence through the groove 135 and pipe 137 to the time delay valve. Also at this time the wide land 178 of the valve body 119 has moved to the left of the radial passages 175 and hence the pressure fluid in the time delay valve to the right of the time delay unit can drain to the sump through the passage 181 and pipe 164. This removes the pressure from the left hand end of the time delay valve body and hence the fluid pressure which is continuously exerted on the right hand end of this valve body shifts the same toward the left from the position shown in Fig. 18 into the position shown in Figs. 4 and 8. As soon as the body of the time delay valve has moved to its normal left hand position the wide land 183 clears the port 192 and hence the pressure fluid in the pipe 163 can drain through the port 189 while similarly the pressure fluid to the right of the shiftable valve body 119 and in the groove 149 and pipe 150 can drain through the ports 186 and 189.

Assuming that the operator desires to have the spindle rotate in the forward direction at the selected speed he now moves the control handle outwardly from position 1 to position 2 to clear the lugs 122a with respect to the lug 121b, it being recalled that at this time the spring pressed plunger 124 is compressed. The operator can now shift the control handle laterally to the left from position N to position F to rock the valve body 118 and bring the passage 172 into communication with the groove 146 from whence the pressure fluid will flow through the groove 145 and pipe 147 to the main clutch and cause said clutch to be engaged, whereupon the transmission and the spindle will be driven in the forward direction at the selected or preselected speed. As soon as the operator releases the control handle while in forward position the plunger 124 moves the control handle inwardly from position II to position I, thus causing the right hand lug 122a to lie to the left of the lug 121b, wherefore the control handle cannot be moved to neutral position until it is rocked outwardly from position I to position II.

Assuming that the operative step has been completed and the operator wishes to stop the rotation of the spindle and the change speed transmission he pulls the control handle outwardly from position I to position II to free the stop lugs and then rocks the control lever laterally from position F to position B, whereupon the passage 173 in the rockable valve body 118 will align with the groove 140 while the passage 172 will move out of alignment with the groove 146 and will be dead-ended and said groove 146 will be connected to the drain port 174. Hence groove 140 is now receiving pressure fluid which flows to groove 139 and pipe 141 and thence to the motor 61 which actuates the brake drum 57 to brake the rotation of the gear 64 and the rotation of the transmission and spindle, it being noted that at this time the main clutch is disengaged. After the braking of the transmission and spindle the operator would move the control handle laterally to neutral position whereupon the passage 173 is dead-ended and the passage 172 is connected to drain. Also at this time the fluid in the pipe to the brake motor 61 is draining.

Assuming that the second operative step in the cycle is a left hand threading operation at a lower speed the operator either during the first step or prior to initiating the second step turns the wheel 104 to set the selector valve 100 at the desired speed for the second step. Then to shift the gearing for the desired speed of the second step the operator at the conclusion of the first step moves the control handle 123 inwardly from position I to position III to shift the valve body 119 from its left hand position of Fig. 5 into its right hand position of Fig. 18 whereupon the crawl speed is initiated as previously explained and pressure fluid flows through the time delay valve to the selector valve and the gear cones are shifted to the selected speed, after which the valve body 119, the control handle 123 and the time delay valve 111 will be returned automatically to their normal positions by fluid pressure. The operator then moves the control handle 123 outwardly from position I to position II, after which he swings the handle laterally from position N to position R to rock the valve body 118, whereupon the passage 172 in said rockable valve body will be connected with the groove 143 and through groove 142 with pipe 144 that extends to the motor 62 which actuates the brake drum 58 of the planetary unit to cause reverse rotation to be imparted to the transmission and the spindle. It will be understood that the control handle will be retained in position R when the operator releases his hold thereon by the left hand lug 122a lying to the right of the lug 122b and it will also be understood that the handle, due to the spring-pressed plunger 124, moves from position II to position I. It will be understood that at the end of the second operative step the operator again moves the control handle 123 outwardly from position I to position II and thence laterally to the left from position R to position B to brake the rotation of the transmission and spindle and thence into neutral position.

The second operative step in the cycle has been described as a left hand threading operation at a lower speed than the first step. It should be noted that had the second operative step required a different speed than the first operative step but still in the forward direction then the operator would not need to move the control handle out of position F (forward) in order to obtain the new spindle speed in the forward direction required for the second operative step. In such case the operator during the first operative step could set the speed selector valve by rotating the hand wheel 104 to preselect the desired spindle speed for the second step. Then upon completion of the first step while the spindle is still rotating at the speed required for the first step the operator need merely move the control handle while in position F inwardly from position I to position III to shift the gear shifting cycle control valve body 119 from its normal left hand position to its right hand position to initiate the gear shifting cycle. As soon as the valve body 119 has been so shifted the main clutch is automatically disengaged, the speed of the transmission and spindle is reduced by the braking action of the crawl speed brake band of the planetary unit until the transmission is rotating in the crawl speed. During this time pressure fluid has flowed through the time delay unit, shifted the time delay valve body to the right and then flowed to the speed selector valve so that when the motors 94, 95 and 96 function to shift the gear cones to obtain the preselected speed the transmission is already in crawl speed and hence the shifting is facilitated. As soon as the shifting has been completed and not prior thereto the cycle valve body 119 is returned to its normal most left hand position whereupon the main clutch is engaged, the time delay valve body is returned to its normal position and the spindle commences rotation in the forward direction at the new speed. A selected or preselected spindle speed can be obtained in a similar manner when the control handle is in brake or reverse positions without necessitating the movement of the control handle from such positions to neutral position.

It will be understood that in the two cases just mentioned as soon as the gear shifting has been completed the transmission will be restored to brake or reverse as the case might be.

From the foregoing explanation of the modes of operation of the mechanism it will be seen that once the gear shifting cycle has been initiated by the manual inward movement of the control handle then said cycle is carried out automatically and at the end thereof the valve body 119 is restored to its normal position.

Although a preferred embodiment of the invention has been illustrated and described herein it will be understood that the invention is susceptible of various adaptations and modifications within the scope of the appended claims.

Having thus described my invention, I claim:

1. In a machine tool having a movable part, a transmission for moving said part at different speeds and including shiftable elements, individual pressure fluid motors for shifting said elements, and means for actuating said motors in predetermined manner and including a pressure fluid source, a pressure fluid circuit from said source to said motors and having therein a settable speed selector valve and a speed changing cycle valve movable from a normal position wherein said circuit to said selector valve and motors is interrupted to a cycle initiating position to cause pressure fluid to flow to said selector valve and said motors to effect predetermined shifting of said elements, said circuit including means functioning automatically upon the completion of the speed changing cycle to restore said cycle valve to its normal position.

2. In a machine tool having a movable part, a transmission for moving said part at different speeds and including shiftable elements, a power source, clutch means between said source and said transmission, a pressure fluid motor for actuating said clutch, individual pressure fluid motors for shifting said elements, and means for actuating said motors in predetermined manner and including a pressure fluid source, a pressure fluid circuit from said pressure fluid source to said motors and having therein a settable speed selector valve and a speed changing cycle valve movable from a normal position wherein said clutch motor receives pressure fluid and said clutch is engaged while said circuit to said individual motors and said selector valve is interrupted to a cycle initiating position to interrupt flow of pressure fluid to said clutch motor to effect disengagement of said clutch and to cause pressure fluid to flow to said selector valve and said individual motors to effect element shifting, said circuit including means functioning automatically upon the completion of the speed changing cycle to restore said cycle valve to its normal position.

3. In a machine tool as defined in claim 2 and wherein said pressure fluid circuit includes a time delay valve intermediate said cycle valve and said speed selector valve and acting to cause the interposition of a time delay between the disengagement of the clutch and the flow of pressure fluid to said selector valve and said individual motors.

4. In a machine tool having a movable part, a transmission for moving said part at different speeds and including shiftable elements, means for imparting a slow nonworking speed to said transmission, a pressure fluid motor for actuating said means, individual pressure fluid motors for shifting said elements and means for actuating said motors in predetermined manner and including a pressure fluid source, a pressure fluid circuit from said source to said motors and having therein a shiftable speed selector valve and a speed changing cycle valve movable from a normal position wherein the flow of pressure fluid to said motors and said selector valve is interrupted and hence said slow nonworking speed means and said individual motors are inactive to a cycle initiating position wherein pressure fluid flows to said slow nonworking speed motor, then said selector valve and then said individual motors to cause initiation of said slow nonworking speed and then the actuation of said individual motors to shift said elements, said circuit including means functioning automatically upon the completion of the speed changing cycle to restore said cycle valve to its normal position to render said slow nonworking speed means inactive and interrupt the flow of pressure fluid to said individual motors and said selector valve.

5. In a machine tool as defined in claim 4 and wherein said pressure fluid circuit includes a time delay valve intermediate said cycle valve and said speed selector valve and acting to cause the interposition of a time delay between the initiation of the slow nonworking speed and the flow of pressure fluid to said selector valve and said individual motors.

6. In a machine tool having a movable part, a transmission for moving said part at different speeds and including shiftable elements, a power source, clutch means between said power source and said transmission, a pressure fluid motor for actuating said clutch, individual pressure fluid motors for shifting said elements, means for imparting a slow nonworking speed to said transmission when said clutch is disengaged, a pressure fluid motor for actuating said last means, and means for actuating said motors in predetermined manner and including a pressure fluid source, a pressure fluid circuit from said source to said motors and having therein a settable speed selector valve and a speed changing cycle valve movable from a normal position wherein said clutch motor receives pressure fluid and said clutch is engaged while the flow of pressure fluid to said individual motors and said selector valve and to said nonworking speed motor is interrupted and hence said clutch is engaged and said nonworking speed means and said individual motors are inactive to a cycle initiating position wherein pressure fluid is interrupted to said clutch motor but flows to said nonworking speed motor and then to said selector valve and said individual motors to cause disengagement of said clutch, initiation of said nonworking speed and the actuation of said individual motors to shift said elements, said circuit including means functioning automatically upon the completion of the speed changing cycle to restore said cycle valve to its normal position to render said nonworking speed means inactive, engage said clutch and interrupt the flow of pressure fluid to said individual motors and said selector valve.

7. In a machine tool as defined in claim 6 and wherein said pressure fluid circuit includes a time delay valve intermediate said cycle valve and said speed selector valve and acting to cause the interpositon of a time delay between the disengagement of the clutch, the initiation of the nonworking speed and the flow of pressure fluid to said selector valve and said individual motors to effect shifting of said elements.

8. In a machine tool having a movable part, a transmission for moving said part at different speeds and including shiftable elements, a power source for driving said transmission and including forward and reverse clutch means, pressure fluid motors for actuating said clutch means, individual pressure fluid motors for shifting said elements, and means for actuating said motors in predetermined manner and including a pressure fluid source, a pressure fluid circuit from said pressure fluid source to said motors and having therein a settable speed selector valve and a speed changing cycle valve movable from a normal position wherein one or the other of said clutch motors receives pressure fluid and one or the other of said forward or reverse clutch means is engaged but said circuit to said individual motors and said selector valve is interrupted to a cycle initiating position to interrupt flow of pressure fluid to said clutch motors to effect disengagement of either said forward clutch means or said reverse clutch means and to cause pressure fluid to flow to said selector valve and said individual motors to effect element shifting, said circuit including means functioning automatically upon the completion of the speed changing cycle to restore said cycle valve to its normal position, said circuit further including a direction control valve settable to selectively control the actuation of said clutch motors when said cycle valve is in normal position.

9. A machine tool as defined in claim 8 and wherein said pressure fluid circuit includes a time delay valve intermediate said cycle valve and said speed selector valve and acting to cause the interposition of a time delay between the disengagement of the clutch means and the flow of pressure fluid to said selector valve and said individual motors.

10. In a machine tool having a movable part, a transmission for moving said part at different speeds and including shiftable elements, a power source for driving said transmission and including forward and reverse clutch means, pressure fluid motors for actuating said clutch means, means for imparting to said transmission a slow nonworking speed drive, a pressure fluid motor for actuating said last means, individual pressure fluid motors for shifting said elements, and means for actuating said motors in predetermined manner and including a pressure fluid source, a pressure fluid circuit from said pressure fluid source to said motors and having therein a settable speed selector valve and a speed changing cycle valve movable from a normal position wherein one or the other of said clutch motors receives pressure fluid and one or the other of said forward or reverse clutch means is engaged while said circuit to said nonworking speed motor and said individual motors and said selector valve is interrupted to a cycle initiating position to interrupt flow of pressure fluid to said clutch motors to effect disengagement of either said forward clutch means or said reverse clutch means and to cause pressure fluid to flow to said nonworking speed motor, then to said selector valve and then to said individual motors to effect first the slow nonworking speed drive of the transmission and then shifting of the shiftable elements to change the speed of said part, said circuit including means functioning automatically upon the completion of the speed changing cycle to restore said cycle valve to its normal position, said circuit further including a direction control valve settable to selectively control the actuation of said clutch motors when said cycle valve is in normal position.

11. In a machine tool as defined in claim 10 and wherein said pressure fluid circuit includes a time delay valve intermediate said cycle valve and said speed selector valve and acting to cause the interposition of a time delay between the disengagement of the clutch and the initiation of the nonworking speed and the flow of pressure fluid to said selector valve and said individual motors to effect shifting of said elements.

12. In a machine tool having a movable part, a transmission for moving said part at different speeds and including shiftable elements, braking means for said transmission, a pressure fluid motor for actuating said braking means, individual pressure fluid motors for shifting said elements and means for actuating said motors in predetermined manner and including a pressure fluid source, a pressure fluid circuit from said source to said motors and having therein a settable speed selector valve and a speed changing cycle valve movable from a normal position wherein said braking means motor may receive pressure fluid to brake the transmission but said circuit to said selector valve and said individual motors is interrupted to a cycle initiating position to interrupt flow of pressure fluid to said braking means motor to effect release of the brake and to cause pressure fluid to flow to said selector valve and said individual motors to effect element shifting, said circuit including means functioning automatically upon the completion of the speed changing cycle to restore said cycle valve to its normal position.

13. A machine tool as defined in claim 12 and wherein said circuit further includes a braking means control valve in series with said cycle valve and acting when said cycle valve is in normal position to selectively control the actuation of said braking means motor to apply and release said braking means.

14. In a machine tool having a movable part, a transmission for moving said part at different speeds and including shiftable elements, braking means for said transmission, a pressure fluid motor for actuating said braking means, means for imparting a slow nonworking drive to said transmission, a pressure fluid motor for actuating said last means, individual pressure fluid motors for shifting said elements, and means for actuating said motors in predetermined manner and including a pressure fluid source, a pressure fluid circuit from said source to said motors and having therein a settable speed selector valve and a speed changing cycle valve movable from a normal position wherein pressure fluid may flow to said braking means motor but is interrupted to said slow nonworking speed motor, said selector valve and said individual motors to a cycle initiating position to interrupt flow of pressure fluids to said braking means motor to effect release of the braking means and to cause pressure fluid to flow to said nonworking speed motor to initiate the slow drive of the transmission and to said selector valve and said individual motors to effect element shifting, said circuit including means functioning automatically upon the completion of the speed changing cycle to restore said cycle valve to its normal position at which time the braking means may be actuated while pressure fluid flow to said nonworking speed motor, said selector valve and said individual motors is interrupted.

15. A machine tool as defined in claim 14 and wherein said pressure fluid circuit includes a time delay valve intermediate said cycle valve and said speed selector valve and acting to cause the interposition of a time delay between the release of the braking means and the initiation of the slow nonworking speed and the flow of pressure fluid to said selector valve and said individual motors to effect shifting of said elements.

16. In a machine tool having a movable part, a transmission for moving said part at different speeds and including shiftable elements, a power source for driving said transmission and including forward and reverse clutch means, pressure fluid motors for actuating said clutch means, brake means for braking said transmission, a fluid pressure motor for actuating said braking means, individual pressure fluid motors for shifting said elements, and means for actuating said motors in predetermined manner and including a pressure fluid source, a pressure fluid circuit from said pressure fluid source to said motor and having therein a settable speed selector valve and a speed changing cycle valve movable from a normal position wherein one or the other of said clutch motors may receive pressure fluid and one or the other of said forward or reverse clutch means may be engaged and wherein pressure fluid may flow to said braking means motor while said circuit to said individual motors and said selector valve is interrupted to a cycle initiating position to interrupt flow of pressure fluid to said clutch motors and said braking means motor to effect disengagement of either of said clutch means and release of said braking means and to cause pressure fluid to flow to said selector valve and said individual motors to effect element shifting, said circuit including means functioning automatically upon the completion of the speed changing cycle to restore said cycle valve to its normal position, said circuit further including a drive control valve in series with said cycle valve and settable to selectively control the actuation of said clutch motors and said braking means motor when said cycle valve is in normal position.

17. A machine tool as defined in claim 16 and wherein said pressure fluid circuit includes a time delay valve intermediate said cycle valve and said speed selector valve and acting to cause the interposition of a time delay between the disengagement of the clutch means and the release of the braking means and the flow of pressure fluid to said selector valve and said individual motors to effect shifting of said elements.

18. In a machine tool having a movable part, a transmission for moving said part at different speeds and including shiftable elements, a power source for driving said transmission and including forward and reverse clutch means, pressure fluid motors for actuating said clutch means, braking means for braking said transmission, a pressure fluid motor for actuating said braking means, means for imparting a slow non-working speed drive to said transmission, a pressure fluid motor for actuating said last named means, individual pressure fluid motors for shifting said elements, and means for actuating said motors in predetermined manner and including a pressure fluid source, a pressure fluid circuit from said pressure fluid source to said motors and having therein a settable speed selector valve and a speed changing cycle valve movable from a normal position wherein one or the other of said clutch motors may receive pressure fluid to engage either of said clutch means while said braking means motor may receive pressure fluid but the flow of pressure fluid to said nonworking speed motor, said selector valve and said individual motors is interrupted to a cycle initiating position to interrupt flow of pressure fluid to said clutch motors and said braking means motor and to cause pressure fluid to flow to said non-working speed motor, said selector valve and said individual motors to effect said non-working speed drive of the transmission and then element shifting, said circuit including means functioning automatically upon the completion of the speed changing cycle to restore said cycle valve to its normal position, said circuit further including a drive control valve in series with said cycle valve and settable to selectively control the actuation of said clutch motors and said braking means motor when said cycle valve is in normal position.

19. A machine tool as defined in claim 18 and wherein said pressure fluid circuit includes a time delay valve intermediate said cycle valve and said speed selector valve and acting when said cycle valve is shifted from normal position to cause the interposition of a time delay between the disengagement of the clutch and the release of the brake, the initiation of the non-working speed and the flow of pressure fluid to said selector valve and said individual motors to effect shifting of said elements.

20. In a machine tool having a movable part, a transmission for moving said part at different speeds and including shiftable elements, a power source for driving said transmission and including forward and reverse clutch means, pressure fluid motors for actuating said clutch means, individual pressure fluid motors for shifting said elements, and means for actuating said motors in predetermined manner and including a pressure fluid source, a pressure fluid circuit from said pressure fluid source to said motors and having therein a settable speed selector valve and a speed changing cycle valve movable from a normal position wherein one or the other of said clutch motors receives pressure fluid and one or the other of said forward or reverse clutch means is engaged while said circuit to said individual motors and said selector valve is interrupted to a cycle initiating position to interrupt flow of pressure fluid to said clutch motors to effect disengagement of either said forward clutch means or said reverse clutch means and to cause pressure fluid to flow to said selector valve and said individual motors to effect element shifting, said circuit including means functioning automatically upon the completion of the speed changing cycle to restore said cycle valve to its normal position, said circuit further including a direction control valve settable to selectively control the actuation of said clutch motors when said cycle valve is in normal position, said cycle valve and said direction control valve being coaxially arranged with said cycle valve located internally of said direction control valve, said cycle valve being shiftable axially and said direction control valve being rockable.

21. A machine tool as defined in claim 20 and wherein a single control handle is operatively associated with said cycle valve and said direction control valve and is movable laterally with respect to the axis of said control valve to rock said control valve and is movable in a direction axially of said control valve to shift said cycle valve.

22. In a machine tool having a movable part, a transmission for moving said part at different speeds and including shiftable elements, a power source for driving said transmission and including forward and reverse clutch means, pressure fluid motors for actuating said clutch means, individual pressure fluid motors for shifting said elements, and means for actuating said motors in predetermined manner and including a pressure fluid source, a pressure fluid circuit from said pressure fluid source to said motors and having therein a settable speed selector valve and a speed changing cycle valve movable from a normal position wherein one or the other of said clutch motors receives pressure fluid and one or the other of said forward or reverse clutch means is engaged but said circuit to said individual motors and said selector valve is interrupted to a cycle initiating position to interrupt flow of pressure fluid to said clutch motors to effect disengagement of either said forward clutch means or said reverse clutch means and to cause pressure fluid to flow to said selector valve and said individual motors to effect element shifting, said circuit including means functioning automatically upon the completion of the speed changing cycle to restore said cycle valve to its normal position, said circuit further including a direction control valve settable to selectively control the actuation of said clutch motors when said cycle valve is in normal position, said cycle valve and said direction control valve being coaxially arranged with said cycle valve located internally of said direction control valve, said cycle valve being shiftable axially and said direction control valve being rockable, a single control handle operatively associated with said cycle valve and said direction control valve and movable laterally with respect to the axis of said direction control valve to rock the latter and movable in a direction axially of said direction control valve to shift said cycle valve, and means operatively associated with said control handle for preventing lateral rocking movement thereof to control engagement and disengagement of said clutches except when said handle is in its most outwardly moved position.

23. A machine tool as defined in claim 22 and wherein said control handle is movable inwardly and outwardly from a normal intermediate position wherein said cycle valve is in its normal position to a most inward position to shift said cycle valve or to a most outward position to enable lateral rocking movement of the handle to rock said direction control valve to engage and disengage said clutches.

CHRYSANTH M. MIROSSAY.

REFERENCES CITED

The following references are of record in the file of this patent:

UNITED STATES PATENTS

| Number | Name | Date |
| --- | --- | --- |
| 1,818,910 | Sanine | Aug. 11, 1931 |
| 2,050,245 | Carter | Aug. 11, 1936 |
| 2,050,520 | Carter | Aug. 11, 1936 |
| 2,234,463 | Brewer | Mar. 11, 1941 |
| 2,384,809 | Bullard et al. | Sept. 18, 1945 |